Patented Aug. 29, 1939

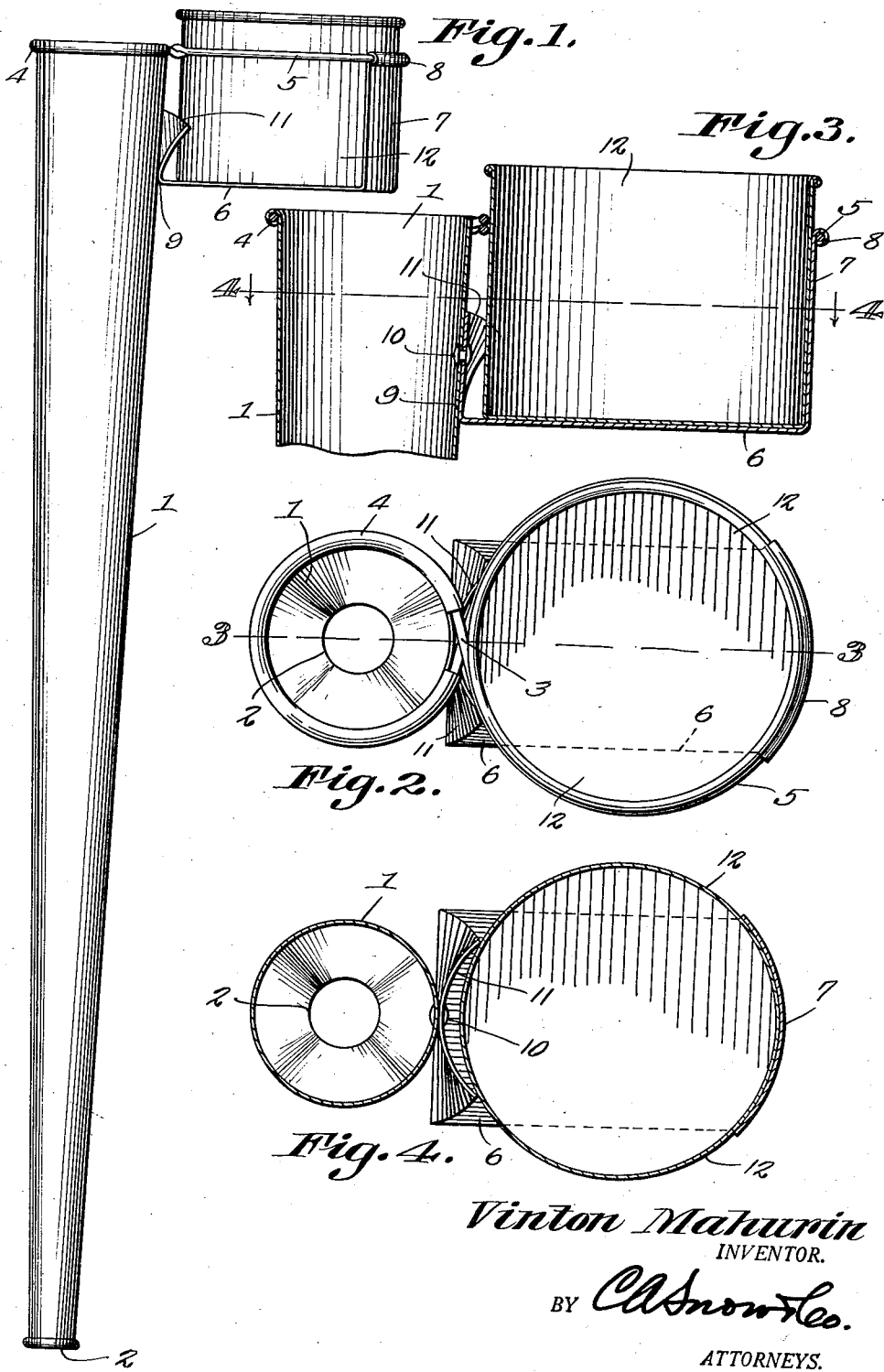

2,171,037

UNITED STATES PATENT OFFICE 2,171,037

PLANTER

Vinton Mahurin, Novinger, Mo.

Application November 30, 1938, Serial No. 243,243

2 Claims. (Cl. 111—92)

This invention relates to a planter designed primarily for use in planting seeds by hand and is particularly useful in the planting of small gardens.

An object of the invention is to provide a planter which is light and durable in construction, can be easily carried and manipulated, has no parts to get out of order, and has a means whereby a supply of seed is constantly on hand where it can be picked up and deposited in the seed-depositing boot or spout portion of the device.

A still further object is to provide a seed holder which can be removed readily for the purpose of dipping it into a bag or other container holding a supply of seed and subsequently connected to the planter where its contents are readily accessible.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a side elevation of the complete planter.

Figure 2 is an enlarged plan view thereof.

Figure 3 is a section on line 3—3, Figure 2, a portion being broken away.

Figure 4 is a section on line 4—4, Figure 3.

Referring to the figures by characters of reference 1 designates an elongated spout or boot, the same preferably being a metal tube tapered slightly toward an outlet 2 at its lower end while its upper end is rolled outwardly over a reenforcing wire 3, the outwardly rolled portion 4 constituting a means for holding the wire assembled with the spout 1. A portion of the wire is extended outwardly beyond the spout to form a ring 5 and a flat metal strip 6, which is located under the ring, has an upwardly extending arm 7 the upper end of which is attached to the ring as shown at 8. This strip 6 is suitably joined to the spout 1 as at 9, solder or a rivet being used for this purpose. In the drawing a rivet has been indicated at 10. That portion of the strip 6 adjacent to the rivet 10 or other attaching means and which is extended upwardly, is preferably bowed laterally as indicated at 11 so as to partly embrace a container 12 which is insertible downwardly into the ring 5 and onto the strip 6 as shown. This container is cup-like and can easily be placed in or removed from the position shown. After it has been removed it can be dipped into a bag, box or other container holding a supply of seed and after the cup has been filled, it can be replaced in the ring and on the supporting bracket formed by strip 6 so that it will thus be properly assembled with the upper portion of the spout 1.

After the cup or container 12 has been supplied with seed, the spout 1 is grasped in one hand and pushed downwardly at its lower end into the soil at the point where seeds are to be planted. The user then removes some seeds from the container 12 and drops them into the spout so that they will fall through the outlet 2 and thus be deposited at the desired point. This operation can be continued along a row until the supply of seeds in the container has been exhausted whereupon the said container 12 can be lifted out of position, again dipped into a sack or other container holding seeds and, after it has been filled, the container 12 can be replaced and the operation continued as before.

It is to be understood of course that the spout or boot 1 is of such length that it can be conveniently handled by a person while in a standing position.

What is claimed is:

1. A planter including an elongated rigid spout having an inlet at one end and an outlet at its other end, said spout being tapered toward the outlet, a bracket extending laterally from the spout near its inlet end, a ring extending from the spout above said bracket, and a container removably mounted in the ring and on the bracket, said container constituting a seed holder.

2. A planter including a rigid spout having an inlet and an outlet at its respective ends, the upper portion of said spout constituting a handle to be grasped in one hand of the user, a ring extending laterally from and connected to the spout adjacent to its inlet, a bracket connected to the spout and extending below and across the ring, a connection between one end of said bracket and the ring, and a cup insertable into the ring and onto the bracket, said cup constituting a removable seed holder.

VINTON MAHURIN.